(12) United States Patent
Jung

(10) Patent No.: US 8,396,520 B2
(45) Date of Patent: Mar. 12, 2013

(54) PORTABLE TERMINAL HAVING A SLIDE MODULE WITH A TILTING UNIT

(75) Inventor: Jaejun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 13/108,889

(22) Filed: May 16, 2011

(65) Prior Publication Data

US 2012/0077555 A1    Mar. 29, 2012

(30) Foreign Application Priority Data

Sep. 27, 2010  (KR) ................. 10-2010-0093450

(51) Int. Cl.
*H04M 1/00*   (2006.01)
*H04M 9/00*   (2006.01)

(52) U.S. Cl. ............. 455/575.4; 455/575.3; 379/433.12; 379/433.13

(58) Field of Classification Search ............... 455/575.4, 455/575.3; 379/433.12, 433.13
See application file for complete search history.

(56) References Cited

U.S. PATENT DOCUMENTS 8,190,219 B2*  5/2012  Park et al. ................. 455/575.4
8,199,475 B2*  6/2012  Yeh et al. ................. 361/679.27
2007/0105606 A1*  5/2007  Yoon et al. ................. 455/575.4
2011/0009169 A1*  1/2011  Kim ................. 455/566
2011/0287819 A1*  11/2011  Lee et al. ................. 455/575.4

FOREIGN PATENT DOCUMENTS

EP    2106101 A2    9/2009
EP    2117204 A1    11/2009
EP    2197182 A1    6/2010

* cited by examiner

*Primary Examiner* — Marisol Figueroa
(74) *Attorney, Agent, or Firm* — Birch, Stewart, Kolasch & Birch, LLP

(57) ABSTRACT

A portable terminal including a first body, a second body having a manipulation portion formed on one surface thereof, the second body being slidably connected to the first body such that the first body is moveable between a closed configuration covering the manipulation portion and an open configuration exposing the manipulation portion, and a slide module connecting the first body to the second body. The slide module includes a tilting unit configured to tilt the first body with respect to the second body at a predetermined angle in the open configuration and a slide member configured to slidably connect the first and second bodies to each other. The slide module imparts a first motion to the first body during movement across a first region of the second body and imparts a second motion different from the first motion to the first body during movement across a second region of the second body. The second motion includes a tilting motion of the first body with respect to the second body.

16 Claims, 10 Drawing Sheets

PORTABLE TERMINAL HAVING A SLIDE MODULE WITH A TILTING UNIT

CROSS-REFERENCE TO RELATED APPLICATIONS

Pursuant to 35 U.S.C. §119(a), this application claims the benefit of an earlier filing date and right of priority to Korean Application No. 10-2010-0093450, filed on Sep. 27, 2010 the contents of which is incorporated by reference herein in its entirety.

BACKGROUND OF THE DISCLOSURE

1. Field of the Disclosure

The present disclosure relates to a portable terminal, and particularly, to a slide type portable terminal capable of tilting an upper body with respect to a lower body at a predetermined angle in an open configuration.

2. Description of Related Art

In general, a portable terminal is a device that can be carried around and is configured to perform one or more functions such as performing voice and video call communications, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions Because the portable terminal is considered as a personal belonging to express a user's personality, various designs are required. For instance, the portable terminal may include a bar type, a slide type, a folder type, a swivel type, and the like.

Among the various types, a slide type of portable terminal includes an upper body and a lower body slidably coupled to each other. The upper body and the lower body are configured to perform a relative sliding operation in the open configuration and the closed configuration, and are arranged in parallel to each other in the open and closed configurations.

As the portable terminal serves as a multimedia player, the slide type of portable terminal is requested to be provided with a structure to provide a more convenient user interface.

BRIEF SUMMARY OF THE DISCLOSURE

Therefore, an object of the present disclosure is to provide a structure capable of enhancing a user's convenience when orienting an upper body with respect to a lower body at a predetermined angle in the open configuration of a slide type portable terminal.

To achieve these and other advantages and in accordance with the purpose of the present disclosure, as embodied and broadly described herein, there is provided a portable terminal includes a first body, a second body having a manipulation portion formed on one surface thereof, the second body being slidably connected to the first body such that the first body is moveable between a closed configuration covering the manipulation portion and an open configuration exposing the manipulation portion, and a slide module connecting the first body to the second body. The slide module includes a tilting unit configured to tilt the first body with respect to the second body at a predetermined angle in the open configuration and a slide member configured to slidably connect the first and second bodies to each other. The slide module imparts a first motion to the first body during movement across a first region of the second body and imparts a second motion different from the first motion to the first body during movement across a second region of the second body. The second motion includes a tilting motion of the first body with respect to the second body.

According to another aspect of the present disclosure, there is provided a portable terminal including a first body, a second body having a manipulation portion formed on one surface thereof, the second body being slidably connected to the first body such that the first body is moveable between a closed configuration covering the manipulation portion and an open configuration exposing the manipulation portion, and a slide module connecting the first body to the second body. The slide module includes a tilting unit configured to tilt the first body with respect to the second body at a predetermined angle during movement between the closed configuration and the open configuration, the tilting unit having a spring that applies a force to the first body to tilt the first body with respect to the second body, and a restriction member formed on one surface of the first body or the second body to restrict application of the force of the spring to the first body during a portion of the movement of the first body from the closed configuration to the open configuration.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE INVENTION

Figure 1:
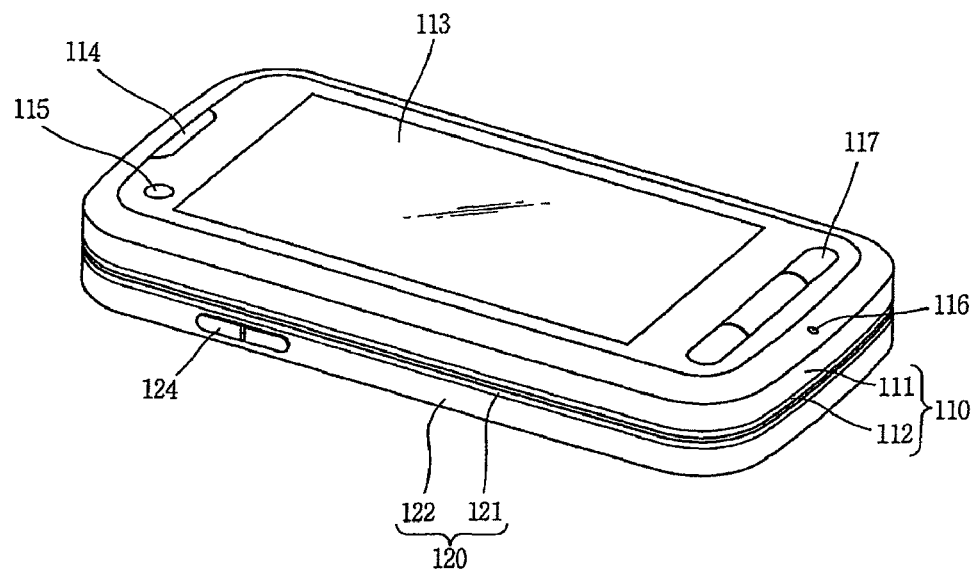
FIG. 1 is a perspective view of a portable terminal in the closed configuration according to an exemplary embodiment of the present disclosure.

Description will now be given in detail of the present disclosure, with reference to the accompanying drawings. The same reference numerals will be given to the same components as those of the aforementioned embodiment, and their explanations will be omitted. Unless stated otherwise, reference to a component in a singular sense is not intended to preclude the possibility that multiple components can be provided.

Figure 2:
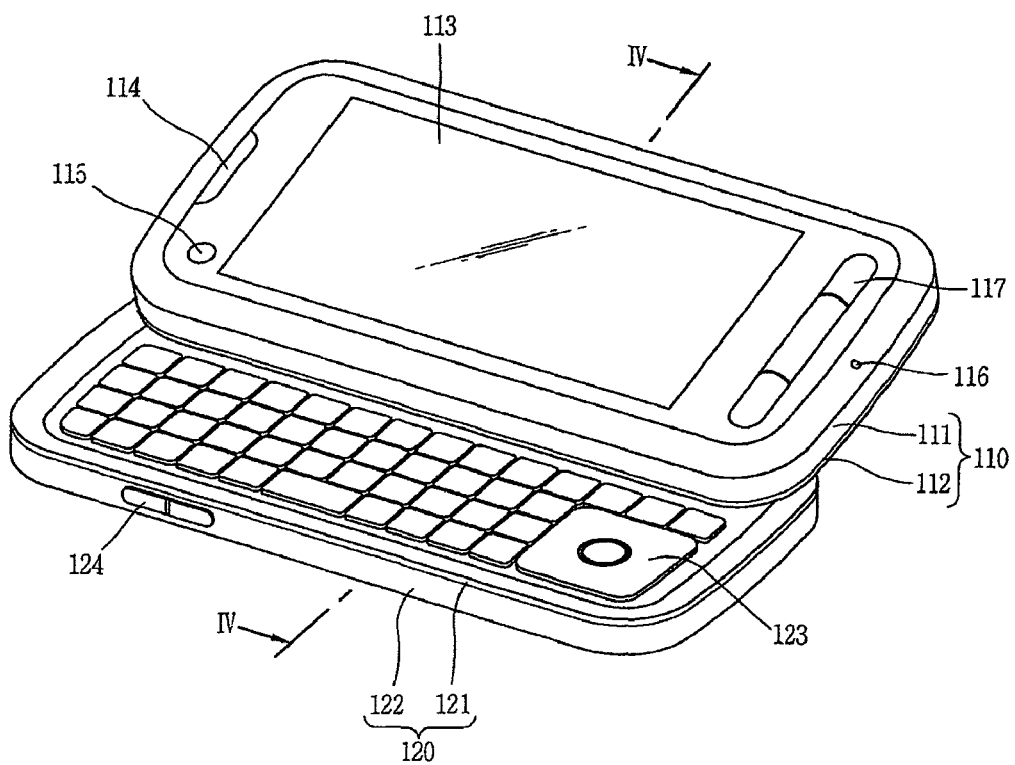
FIG. 2 is a perspective view of a portable terminal in the open configuration according to an exemplary embodiment of the present disclosure.
Figure 3:
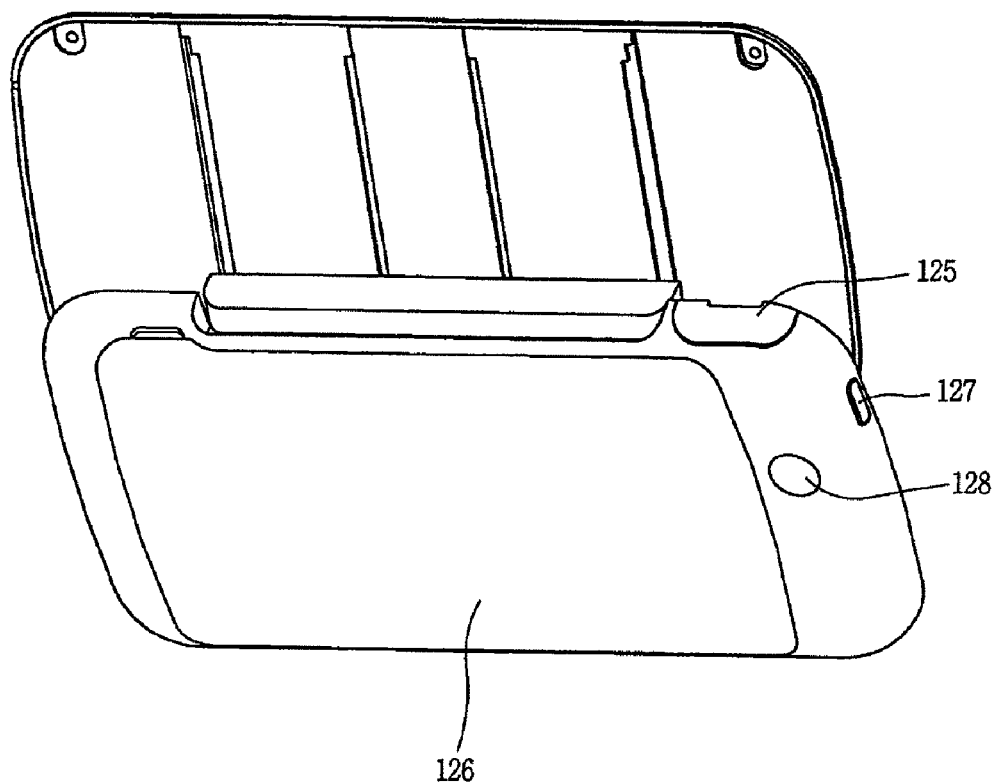
FIG. 3 is a rear perspective view of the portable terminal of FIG. 2.

FIGS. 1 and 2 are front perspective views of a portable terminal according to an exemplary embodiment of the present disclosure. FIG. 3 is a rear perspective view of the portable terminal of FIG. 2.

The portable terminal according to an exemplary embodiment of the present disclosure includes a first body 110, and a second body 120 coupled to the first body 110 so as to perform a relative sliding operation. As shown in FIG. 1, a state where the first body 110 and the second body 120 are arranged to overlap each other may be called a 'closed configuration'. As shown in FIG. 2, a state where one or more parts of the second body 120 are exposed by displacement of the first body 110 may be called an 'open configuration'.

The first body 110 is slidably coupled to the second body 120 so as to perform a sliding operation in a horizontal or widthwise direction of the second body 120. This configuration is preferable for a display unit 113 to output a wider screen when the portable terminal performs a multi-media function. However, the first body 110 may be configured so as to perform a sliding operation in a vertical or lengthwise direction of the second body 120.

Referring to FIG. 1, the first body 110 is arranged in parallel to the second body 120 in the closed configuration. Referring to FIG. 2, the first body 110 is arranged to be tilted with respect to the second body 120 at a predetermined angle in the open configuration. As the portable terminal is moved from the open configuration to the closed configuration, one end of the first body 110 is lowered toward the second body 120. As a result, another end of the first body 110 is lifted up from the second body 120.

A case (casing, housing, cover, and the like) forming an outer appearance of the first body 110 may include a front case 111 and a rear case 112. A space formed by the front case 111 and the rear case 112 may accommodate various components therein. At least one intermediate case (not shown) may further be disposed between the front case 111 and the rear case 112. Such cases may be formed by injection-molded synthetic resin, or may be formed using a metallic material such as stainless steel (STS) or titanium (Ti).

A first display unit 113, a first audio output unit 114, a first image input unit 115, an audio input unit 116, a first manipulation unit 117, and the like may be disposed on the first body 110. The display unit 113 may be a liquid crystal display (LCD) module, an organic light radiating diodes (OLED) module, and the like for visually displaying information. The display unit 113 may further include a touch screen for inputting information by a user's touch. The first audio output unit 114 may be implemented as a receiver or a speaker, and the first image input unit 115 may be implemented as a camera module for capturing a still image or a moving image of a user or other subject. The audio input unit 116 may be configured to receive a user's voice, other sounds, and the like. The audio input unit 116 may be implemented as a microphone. The first manipulation unit 117 is configured to receive commands to control the operation of the portable terminal according to an exemplary embodiment of the present disclosure.

Similar to the first body 110, a case of the second body 120 may be formed by a front case 121 and a rear case 122. A second manipulation unit 124 may be disposed on a front surface of the front case 121 of the second body 120. A manipulation portion 123, an interface 125, and the like may be disposed on at least one of the front case 121 and the rear case 122. The first and second manipulation units 117 and 124 may be referred to collectively as a manipulation unit, and may include any type of units that can be manipulated in a tactile manner. For example, each manipulation unit may be implemented as dome switches or a touch pad for receiving commands or information by a user's push or touch operation, or may be implemented as a jog wheel or a joystick.

In the aspect of functions, the first manipulation unit 117 may be used to input commands such as START, END and SCROLL, and the second manipulation unit 124 may serve as hot keys for performing specific functions such as activation of the first image input unit 115.

The interface 125 may serve as a passage through which the portable terminal of the present disclosure exchanges data with an external device. For instance, the interface 125 may be implemented as at least one of a wired/wireless connection port for connecting an earphone to the portable terminal, a short-range communications port (e.g., an Infrared Data Association (IrDA) port, a Bluetooth port, a wireless LAN port, and the like), power supply ports for providing power to the portable terminal, or the like. The interface 125 may be configured using a card socket (e.g., for coupling to a memory card, a subscriber identity module (SIM) card, a user identity module (UIM) card, and the like).

A power supply unit 126 for supplying power to the portable terminal may be mounted in the rear case 122. The power supply unit 126 may be implemented as a rechargeable battery.

A broadcast signal receiving antenna 127 may be disposed at one side of the rear case 122, in addition to an antenna for communications. The broadcast signal receiving antenna 127 may be configured to retract into the lower body 120.

Referring to FIG. 3, a second image input unit 128 may be additionally provided on the rear case 122 of the second body 120. The second image input unit 128 faces a direction which is opposite to a direction faced by the first image input unit 115 (refer to FIG. 1), and may have different pixels from those of the first image input unit 115.

For example, the first image input unit 115 may operate with relatively lower pixels (lower resolution). Thus, the first image input unit 115 may be useful when a user can capture his face and send it to another party during a video call or the like. On the other hand, the second image input unit 128 may operate with a relatively higher pixels (higher resolution) such that it can be useful for a user to obtain higher quality pictures for later use.

A flash (not shown) and a mirror (not shown) may be additionally disposed adjacent to the second image input unit 128. The flash operates in conjunction with the second image input unit 128 when taking a picture using the second image input unit 128. The mirror can cooperate with the second image input unit 128 to allow a user to photograph himself or herself in a self-portrait mode.

A second audio output unit 131 may be further disposed on the rear case 122. The second audio output unit 131 can cooperate with the first audio output unit 114 (refer to FIG. 1) to implement a stereo function. Also, the second audio output unit 131 may be configured to operate as a speakerphone.

While various components have been described as being arranged at the second body 120, the present disclosure is not so limited. For instance, at least one of the components arranged at the rear case 122 may be mounted to the first body 110, such as, the rear case 112. In this manner, the components arranged at the rear case 112 may be protected by the second body 120 in the closed configuration. Even if the second image input unit 128 is not additionally provided, the first image input unit 115 may be rotatably formed to capture an image captured by the second image input unit 128.

Figure 4:
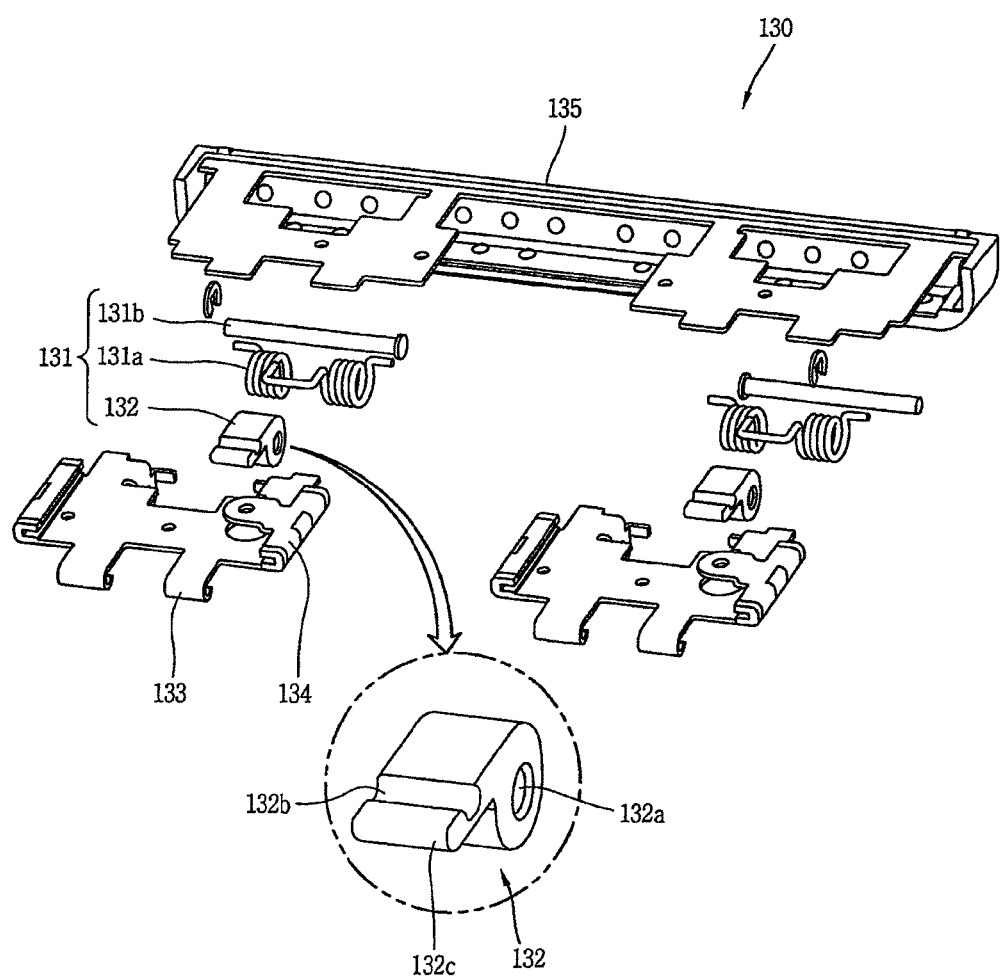
FIG. 4 is an exploded perspective view of a slide module according to an exemplary embodiment of the present disclosure.
Figure 5:
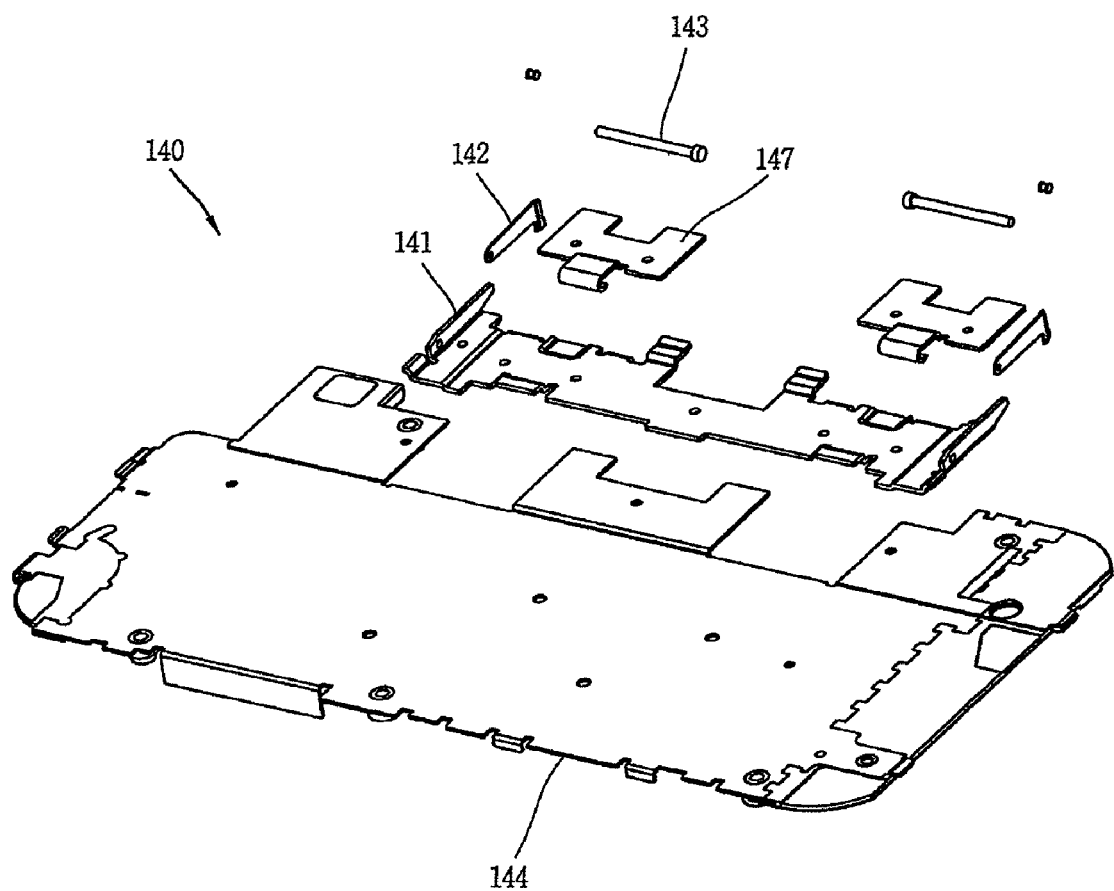
FIG. 5 is an exploded perspective view of a fixing frame according to an exemplary embodiment of the present disclosure.

FIG. 4 is an exploded perspective view of a slide module 130 according to an exemplary embodiment of the present disclosure, and FIG. 5 is an exploded perspective view of a fixing frame 144 according to an exemplary embodiment of the present disclosure. As shown in FIG. 4, the slide module 130 according to an exemplary embodiment of the present disclosure includes a tilting unit 131 configured to tilt the first body 110 with respect to the second body 120 at a predetermined angle in the open configuration, and a slide member configured to slidably connect the first body 110 and the second body 120 to each other such that the manipulation unit 123 formed on one surface of the second body 120 is exposed when the first body 110 is moved from the closed position to the open position.

In this exemplary embodiment, the tilting unit 131 may include a spring 131a, an arm member 132 elastically supported by the spring 131a on a supporting shaft 131b. The tilting unit 131 may further include a first frame 141 (see FIG. 5) and a second frame 133 hinge-coupled to the first frame 141 (see FIGS. 12 and 13). The arm member 132 may include a fixing portion 132a, a supporting portion 132b and a rolling portion 132c. The fixing portion 132a is coupled to the supporting shaft 131b together with the spring 131a, and the supporting portion 132b provides elastic support by being coupled to an extended part of the spring 131a. The fixing portion 132a and the supporting shaft 131b may be press-fitted together. The rolling portion 132c at one end of the arm member 132 is formed to roll-contact the first frame 141 on one surface of the first frame 141 by an elastic energy of the spring 131a. The second frame 133 may include rail portions 134 such that the first body 110 performs a sliding operation therealong, and grooves 152a (see FIG. 8) corresponding to the rail portions 134 may be formed at the first body 110.

The slide module 130 may further include a housing 135 such that components inside the slide module 130 are protected in the open configuration. The housing 135 may be coupled to the second frame 133, thereby being tilted together with the first body 110.

Under this configuration, the slide module 130 may be arranged at a rear side of the manipulation portion 123 of the second body 120 at a predetermined distance from the manipulation portion 123. The slide module 130 may be integrally mounted in the housing 135. Accordingly, in the portable terminal according to an exemplary embodiment of the present disclosure, the second body 120 may have a minimized thickness, and the rear case 122 of the second body 120 may have a curved surface.

As shown in FIG. 5, a first fixing frame module 140 includes a curtain member 142, a tilting shaft 143, and a first fixing frame 144. The first fixing frame 144 may be formed of stainless steel or synthetic resin, and the manipulation portion 123 such as a second display unit and a keypad may be formed on an upper surface of the first fixing frame 144. The first frame 141 may be slidably coupled to the first fixing frame 144. Because the first frame 141 is slidably coupled to the first fixing frame 144, an exposed area of the manipulation portion 123 to the second body 120 in the open configuration may be increased. The first frame 141 may be provided with a holder frame 147 for inserting the tilting shaft 143. The curtain member 142 may be coupled to a side surface of the first frame 141. The curtain member 142 is provided with a locking portion having one protruded end, and the locking portion is coupled to the second frame 133 or the housing 135. Under this configuration, when the first body 110 is tilted, the locking portion moves together with the second frame 133 or the housing 135. As a result, the curtain member 142 covers a side surface of the slide module 130, thereby protecting a flexible printed circuit board 155 (see FIG. 9) in the open configuration.

Figure 6:
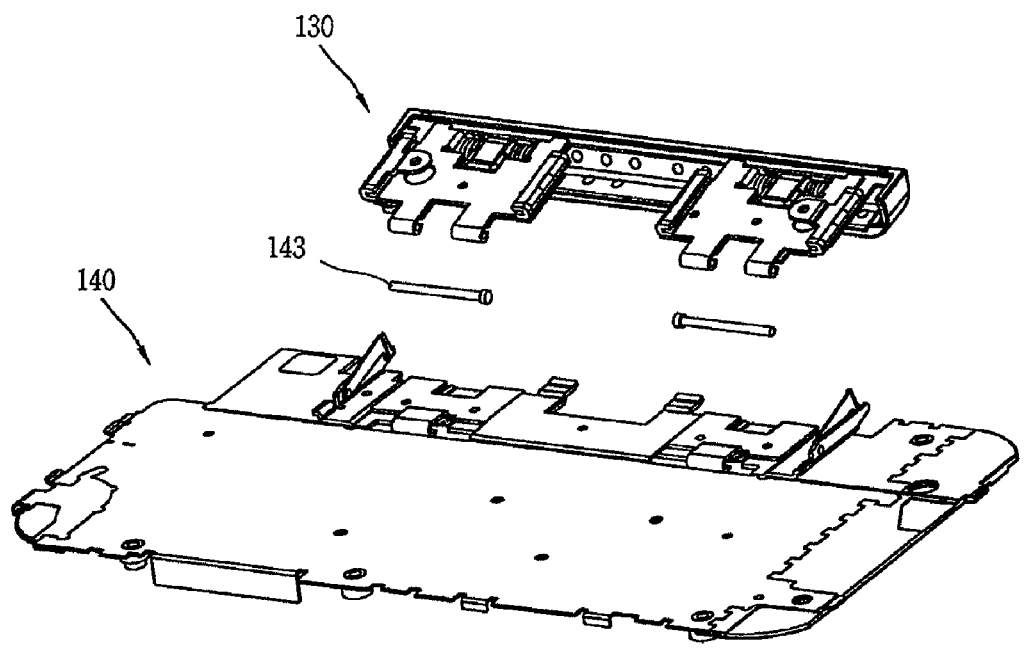
FIG. 6 is a perspective view showing a state before the slide module and the fixing frame are coupled to each other according to an exemplary embodiment of the present disclosure.
Figure 7:
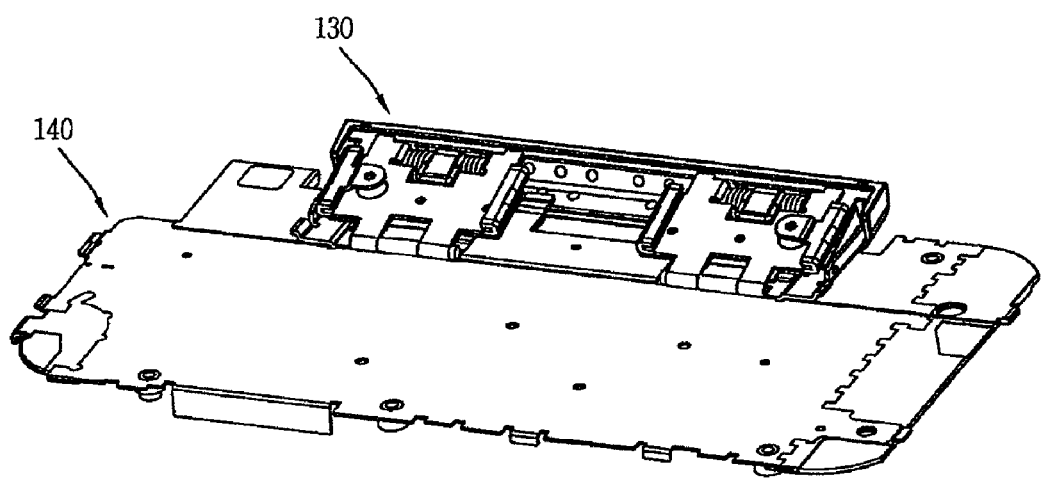
FIG. 7 is a perspective view showing a state after a slide module and a fixing frame are coupled to each other according to an exemplary embodiment of the present disclosure.

FIG. 6 is a perspective view showing a state before the slide module 130 and the first fixing frame module 140 are coupled to each other according to an exemplary embodiment of the present disclosure, and FIG. 7 is a perspective view showing a state after the slide module 130 and the fixing frame module 140 are coupled to each other according to an exemplary embodiment of the present disclosure. As shown, the sliding module 130 is coupled to the first fixing frame 144 by the tilting shaft 143. The first fixing frame 144 may constitute at least a part of the front case 121 of the second body 120. Since the slide module 130 has an integrated simple configuration in the housing 135, the second body 120 may have a minimized thickness and an exposed area of the manipulation portion 123 may be increased.

Figure 8:
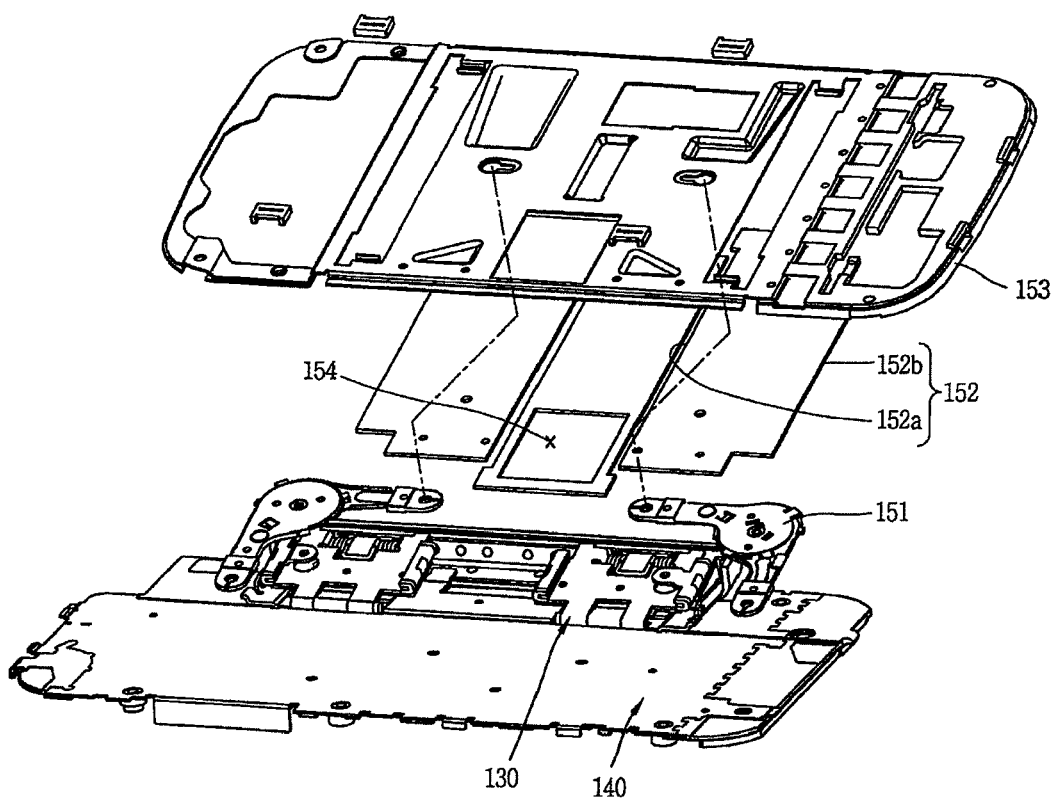
FIG. 8 is a view showing a coupled state among a slide module, a first fixing frame, a restriction member and a second fixing frame according to an exemplary embodiment of the present disclosure.

FIG. 8 is a view showing a coupled state among a slide module 130, a first fixing frame 144, a restriction member 152 and a second fixing frame 153 according to an exemplary embodiment of the present disclosure. The second fixing frame 153 may constitute the rear case 112 of the first body 110 together with the restriction member 152. Side end portions 152b and grooves 152a of the restriction member 152 are coupled to the second frame 133. By this coupling, the first body 110 is slidably moved with respect to the second body 120. The restriction member 152 may be formed by implementing the grooves not only on side surfaces of the first body 110, but also on side surfaces of the second body 120.

A spring module 151 is mounted between the first fixing frame 144 and the second frame 153 so as to provide an elastic force thereto when the first fixing frame 144 and the second frame 153 perform a relative motion with respect to each other. A configuration of the spring module 151 is known, and thus its detailed configuration thereof will be omitted.

A hole 154 is formed between the restriction member 152 and a space is provided between the tilting units 131. The FPCB 155 passes through the hole 154 and the space such that the first body 110 and the second body 120 exchange electric signals with each other. The FPCB 155 may be arranged so as to have a curved state of an 'S' form, may have both ends connected to the first body 110 and the second body 120, respectively, and may be arranged so as to maintain a curved state in the open configuration.

Figure 9:
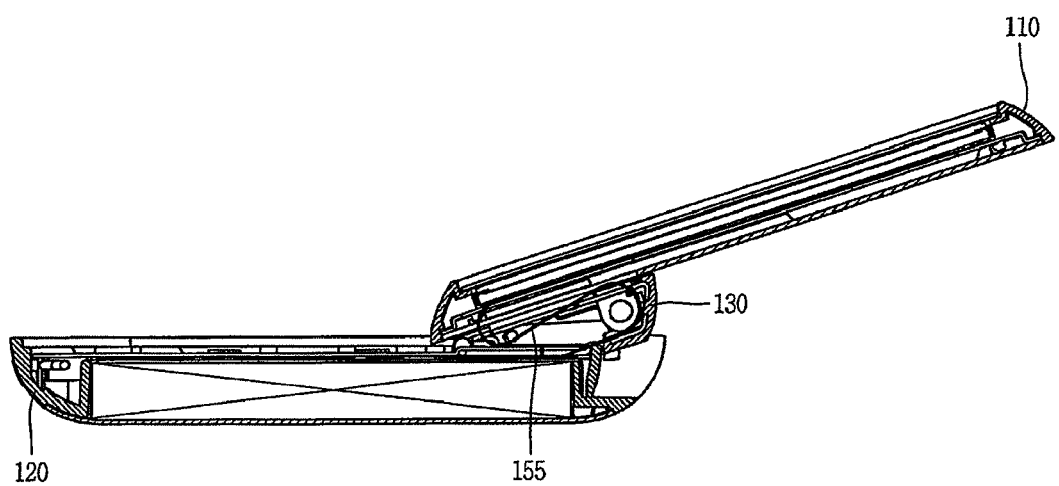
FIG. 9 is a sectional view taken along line 'IV-IV' in FIG. 2.

FIG. 9 is a sectional view taken along line 'IV-IV' in FIG. 2. As shown, the FPCB 155 is arranged in the hole between the restriction member 152 and the tilting unit 131 so as to have a curved state of an 'S' form. If the FPCB 155 is arranged in the form of 'U', the FPCB 155 has to be formed to have a length long enough for both ends thereof to be coupled to the first body 110 and the second body 120, respectively, e.g. longer than an 'S' form. In this case, when the portable terminal is in the open configuration from the closed configuration, the FPCB may be bent or folded due to its length. If this bending or folding is repeated, the FPCB 155 may be damaged. In the portable terminal according to an exemplary embodiment of the present disclosure, a sufficient space is formed in the slide module 130. Accordingly, the FPCB 155 may be arranged to have a curved state of an 'S' form in spite of its length.

Figure 10:
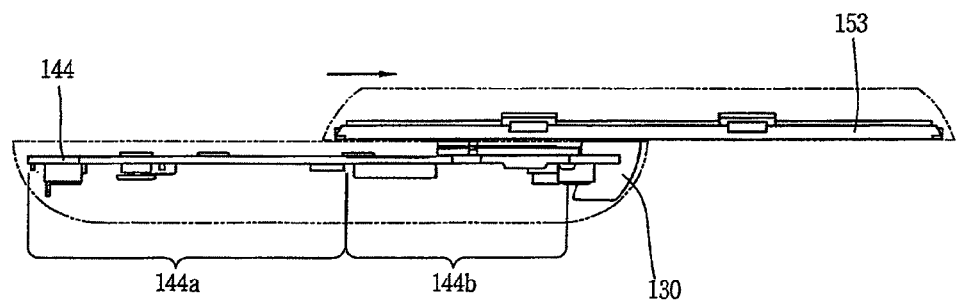
FIGS. 10 and 11 are planar views showing an operation state of a portable terminal in a state that components of FIG. 8 have been coupled to each other according to an exemplary embodiment of the present disclosure.
Figure 11:
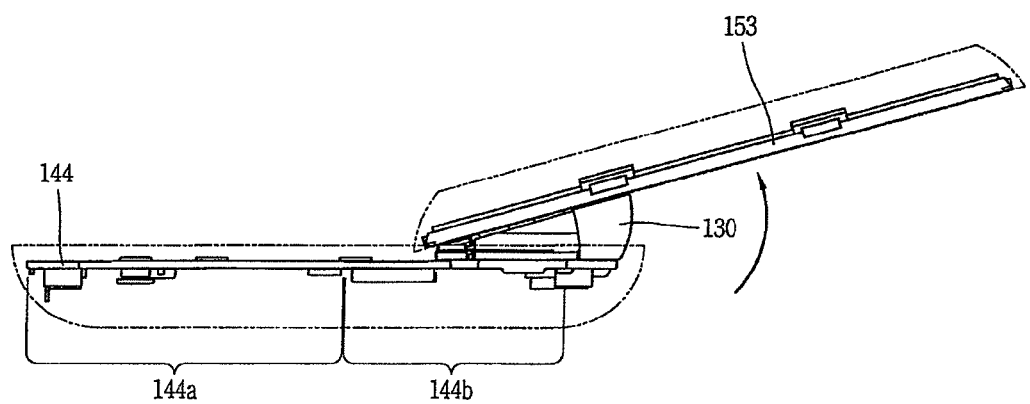

FIGS. 10 and 11 are planar views showing an operation state of the portable terminal in a state that the components of FIG. 8 have been coupled to each other according to an exemplary embodiment of the present disclosure. As shown, the first fixing frame 144 and the second fixing frame 153 are slidably connected to each other by the slide module 130. An upper surface of the fixing frame 144 may be divided into a first region 144a where a sliding operation is performed and a second region 144b where a sliding operation and a tilting operation are simultaneously performed. The tilting operation can be controlled by restricting an elastic force of the spring 131a and also by controlling a length and shape of the groove 152a of the restriction member 152. For instance, if the length of the groove 152a is short, the tilting operation can begin sooner during the sliding operation thereby increasing the size of the second region 144b. If the length of the groove 152a is, the tilting operation occurs later during the sliding operation thereby decreasing the size of the second region 144b. The second region 144b where the tilting operation is performed may also be controlled by a shape of side surfaces of the first body 110.

Figure 12:
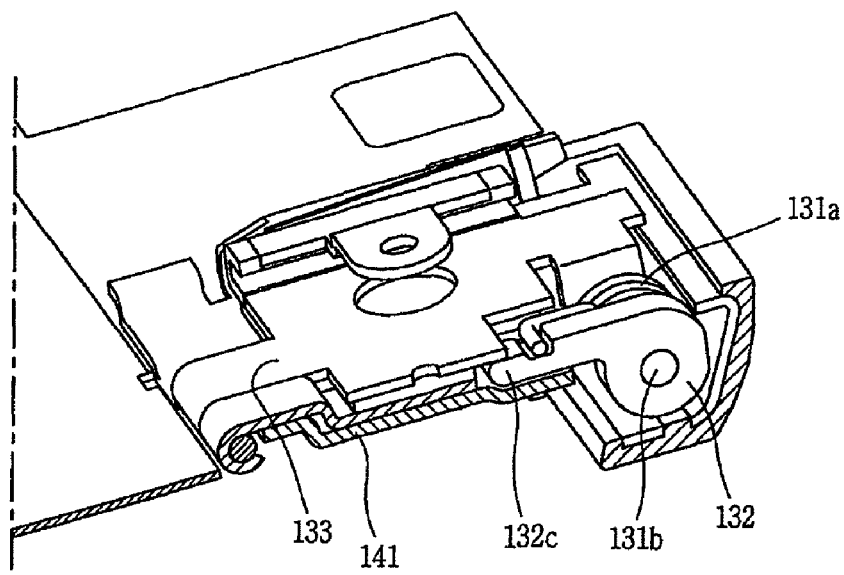
FIGS. 12 and 13 are views showing an operation state of a tilting unit of a portable terminal according to an exemplary embodiment of the present disclosure.
Figure 13:
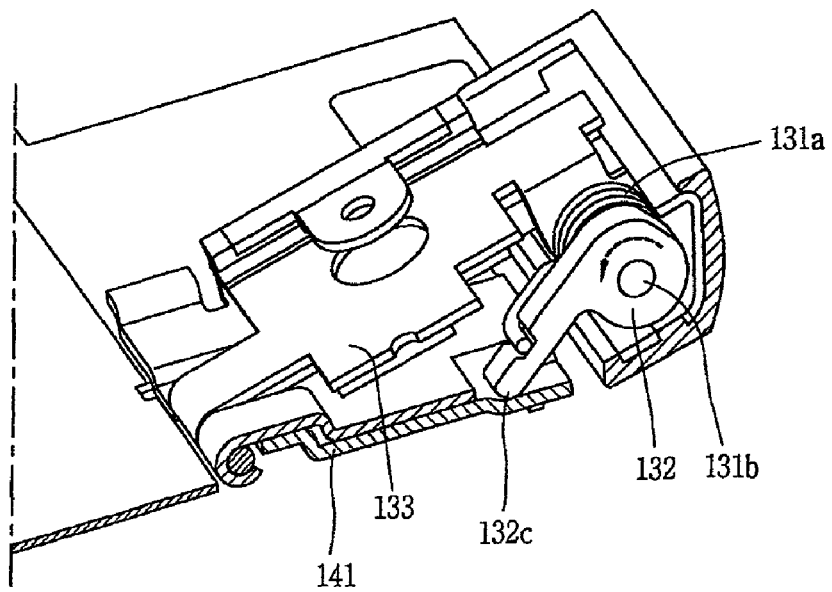

FIGS. 12 and 13 are views showing an operation state of the tilting unit 131 of the portable terminal according to an exemplary embodiment of the present disclosure. Once restrictions on the elastic force of the spring 131a are released, the rolling portion 132c of the arm member 132 is rotated centering around the supporting shaft 131b to press one surface of the first frame 141. This causes the first body 110 to be tilted with respect to the second body 120.

Figure 14:
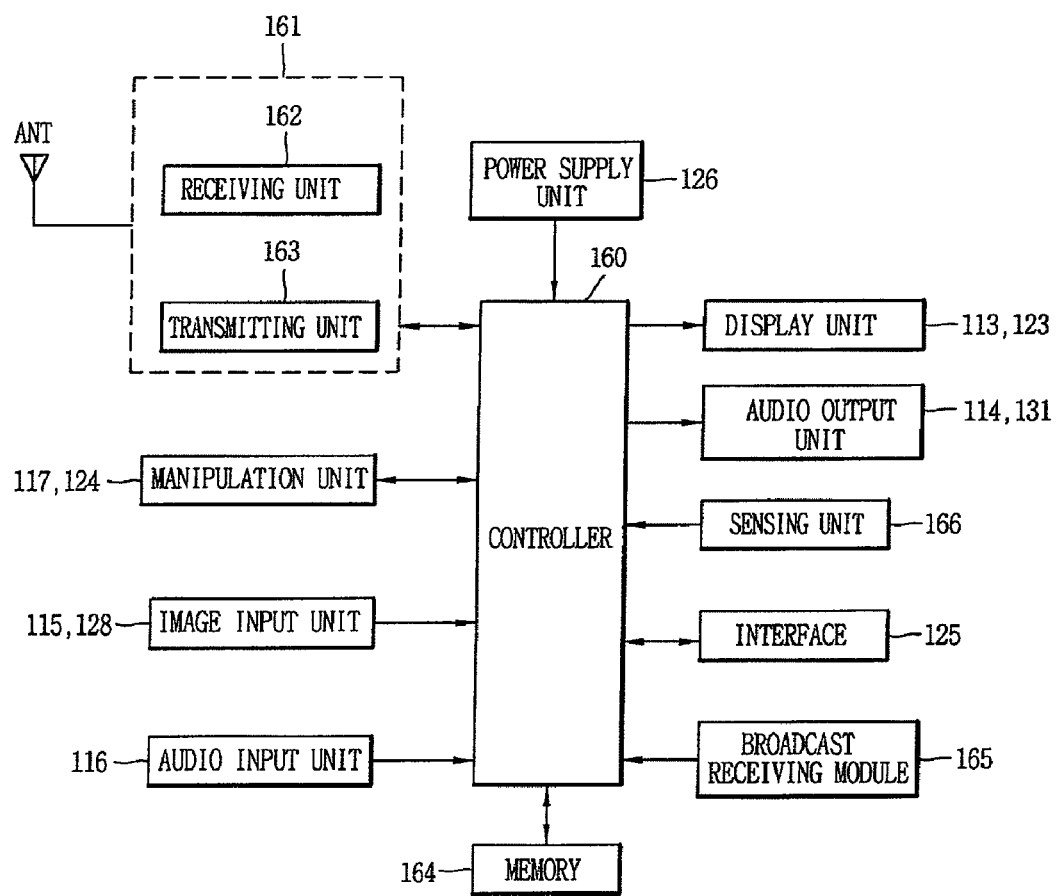
FIG. 14 is a block diagram showing a functional configuration and a control system of a portable terminal according to an exemplary embodiment of the present disclosure.

FIG. 14 is a block diagram showing the portable terminal according to an exemplary embodiment of the present disclosure. Referring to FIG. 14, the portable terminal according to an exemplary embodiment of the present disclosure comprises a wireless communication module 161, first and second manipulation units 117, 124, first and second image input units 115, 128, an audio input unit 116, display units 113, 123, audio output units 114, 131, a sensing unit 166, an interface 125, a broadcast receiving module 165, a memory 164, a power supply unit 126, and a controller 160.

The controller 160 controls an entire operation of the portable terminal. For instance, the controller 160 performs controls and processes relating to voice communication, data communication, video communication, and the like.

The wireless communication module 161 transmits/receives wireless signals to/from a base station through an antenna. For instance, the wireless communication module 161 transmits/receives voice data, text data, image data, and control data under control of the controller 160. The wireless communication module 161 includes a transmitting unit 163 for transmitting signals after a modulation process, and a receiving unit 162 for demodulating received signals.

The first and second manipulation units 117 and 124 provide, to the controller 160, key input data input by a user so as to control the operation of the portable terminal.

The first and second image input units 115 and 128 process image frames such as still images or moving images captured by an image sensor in a video-call mode or a capturing mode. Then, the processed image frames are converted to image data that can be displayed on the display units 113 and 123, thereby being output to the display units 113 and 123. Image frames processed by the first and second image input units 115 and 128 are stored in the memory 164 under control of the controller 160, or are transmitted to outside through the wireless communication module 161.

The audio input unit 116 receives an external audio signal through a microphone in a call mode, or a recording mode, or a voice recognition mode, and the like, and then processes the received signal into electric voice data. In the case of a call mode, the processed voice data is converted into data that can be transmitted to the base station through the wireless communication module 161, and then is output to the wireless communication module 181. In the case of a recording mode, the processed voice data is output so as to be stored in the memory 164. The audio input unit 116 may include assorted noise removing algorithms to remove noise generated in the course of receiving the external audio signal.

The display units 113 and 123 may output information processed in the portable terminal. For example, when the portable terminal operates in a phone call mode, the display units 113 and 123 will provide a User Interface (UI) or a Graphic User Interface (GUI) which includes information associated with the call under control of the controller 160. As another example, if the portable terminal is in a video call mode or a capturing mode, the display units 113 and 123 may display captured images, or UI or GUI under control of the controller 160. When the display unit 113 includes a touch screen, the display unit 113 may be used as an input device as well as an output device.

In a call mode or a recording mode, a voice recognition mode, a broadcasting signal reception mode, and the like, the first and second audio output units 114 and 131 convert audio data received from the wireless communication module 161, or audio data stored in the memory 164, under control of the controller 160. Then, the audio output units 114 and 131 output the converted data to outside. The audio output units 114 and 131 output audio signals relating to functions performed in the portable terminal, such as sound indicating a call signal reception, or sound indicating a message reception.

The sensing unit 166 senses a current status of the portable terminal such as the open/close status of the portable terminal, a position of the portable terminal, or whether a user has contacted the portable terminal, thereby generating sensing signals to control the operation of the portable terminal. For instance, the sensing unit 166 performs sensing functions relating to whether power has been supplied from the power supply unit 126, or whether the interface 125 has been coupled to an external device, and the like.

The interface 125 interfaces a wire/wireless headset, an external charger, a wire/wireless data port, a card socket (e.g., memory card, SIM/UIM card), and the like, with any types of external devices connected to the portable terminal. The interface 125 transmits data or power received from external devices, to each component in the portable terminal, or transmits data in the portable terminal to the external devices.

The memory 164 may store programs to be processed and controlled by the controller 180, or may temporarily store input/output data (e.g., phonebook, messages, still images, moving images, and the like). The memory 164 may store programs to control the operation of the portable terminal according to an exemplary embodiment of the present disclosure. The memory 164 may be implemented using any type of suitable storage medium including a flash memory type, a hard disk type, a multimedia card micro type, a memory card type (e.g., SD or DX memory), Random Access Memory (RAM), Read-Only Memory (ROM), and the like.

The broadcast receiving module 165 receives broadcasting signals transmitted through satellite or terrestrial wave, and then converts them to broadcasting data that can be output to the audio output units 114, 131 and the display units 113, 123, thereby outputting the broadcasting data to the controller 160. The broadcast receiving module 165 receives broadcasting-related additional data (e.g., Electric Program Guide: EPG, channel list, and the like). Broadcasting data and additional data converted by the broadcast receiving module 165 may be stored in the memory 164.

The power supply unit 126 receives inner or outer power, and supplies the power to each component of the portable terminal under control of the controller 160.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
    a first body;
    a second body having a manipulation portion formed on one surface thereof, the second body being slidably connected to the first body such that the first body is moveable between a closed configuration covering the manipulation portion and an open configuration exposing the manipulation portion; and
    a slide module connecting the first body to the second body, the slide module including:
        a tilting unit configured to tilt the first body with respect to the second body at a predetermined angle in the open configuration; and
        a slide member configured to slidably connect the first and second bodies to each other,
    wherein the slide module imparts a first motion to the first body during movement across a first region of the second body and imparts a second motion different from the first motion to the first body during movement across a second region of the second body, the second motion including a tilting motion of the first body with respect to the second body, and
    wherein the slide module includes a housing defining the exterior of the slide module such that the tilting unit and slide member are protected in the open configuration.

2. The portable terminal of claim 1, wherein the tilting unit includes a spring and an arm member elastically supported by the spring.

3. The portable terminal of claim 2, wherein the tilting unit includes:
    a first frame coupled to said one surface of the second body;
    a second frame hinge-coupled to the first frame; and
    a supporting shaft formed at one end of the second frame to support the spring and the arm member, the arm member being located between the first frame and the second frame such that the second frame is configured to provide an inclination surface when the first body is at the open configuration.

4. The portable terminal of claim 3, wherein the arm member comprises:
    a fixing portion fixed to the supporting shaft;
    a supporting portion elastically supported by the spring; and
    a rolling portion in rolling contact with a surface of the first frame.

5. The portable terminal of claim 3, wherein the first frame is slidable with respect to the second body.

6. The portable terminal of claim 3, wherein the first body includes a groove and the second frame includes a rail portion configured to be inserted into the groove of the first body to allow the first body to move with respect to the second body.

7. The portable terminal of claim 1, further comprising a curtain member having one end protruding from a side surface of the first frame and contacting a part of the housing, the curtain member being configured to be tilted with the first body.

8. The portable terminal of claim 1, wherein the housing is coupled to the second frame so as to be tilted with the first body at the second region.

9. The portable terminal of claim 1, further comprising a flexible printed circuit board configured to allow signal exchange between the first and second bodies,
    wherein the slide module includes a second tilting unit and the tilting units are spaced from each such that the flexible printed circuit board passes therethrough.

10. The portable terminal of claim 9, wherein the flexible printed circuit board has a curved 'S' shape, the flexible printed circuit board having one end connected to the first body and the second end connected to the second body, and
    wherein the flexible printed circuit board maintains the curved shape in the open configuration.

11. The portable terminal of claim 1, wherein the first body includes a first display unit configured to display first visual information, and
    wherein the manipulation portion of the second body includes at least one of a second display unit configured to display second visual information relating to the first visual information and a keypad having a plurality of key buttons.

12. The portable terminal of claim 1, further comprising a restriction member at the first body, the restriction member being configured to prevent tilting of the first body during the first motion of the first body through the first region.

13. The portable terminal of claim 12, wherein the restriction member includes a slide groove formed on a surface of the first body.

14. A portable terminal comprising:
    a first body;

a second body having a manipulation portion formed on one surface thereof, the second body being slidably connected to the first body such that the first body is moveable between a closed configuration covering the manipulation portion and an open configuration exposing the manipulation portion; and a slide module connecting the first body to the second body, the slide module including:

a tilting unit configured to tilt the first body with respect to the second body at a predetermined angle during movement between the closed configuration and the open configuration, the tilting unit having a spring that applies a force to the first body to tilt the first body with respect to the second body; and a restriction member formed on one surface of the first body or the second body to restrict application of the force of the spring to the first body during a portion of the movement of the first body from the closed configuration to the open configuration, wherein the slide module includes a housing defining the exterior of the slide module such that the tilting unit and restriction member are protected in the open configuration.

15. The portable terminal of claim 14, wherein the tilting unit includes:

a first frame coupled to said one surface of the second body;

a second frame hinge-coupled to the first frame; and a supporting shaft formed at one end of the second frame to support the spring and the arm member, the aim member being located between the first frame and the second frame such that the second frame is configured to provide an inclination surface when the first body is at the open configuration.

16. The portable terminal of claim 15, wherein the housing is formed to be coupled to the second frame so as to be tilted with the first body.

* * * * *